United States Patent
Wei et al.

(10) Patent No.: US 10,291,126 B1
(45) Date of Patent: May 14, 2019

(54) SINGLE-INDUCTOR MULTIPLE-OUTPUT DC/DC CONVERTERS WITH PULSE-SKIPPING MODE AND DEADTIME SWITCH CONTROL

(71) Applicant: BravoTek Electronics Co., Ltd., Hsinchu County (TW)

(72) Inventors: Wei-Hsin Wei, Hsinchu County (TW); Yi-Cheng Hsu, Hsinchu County (TW); Wei-Lun Hsieh, Hsinchu County (TW)

(73) Assignee: BravoTek Electronics Co., Ltd., Hsinchu County (TW)

( * ) Notice: Subject to any disclaimer, the term of this patent is extended or adjusted under 35 U.S.C. 154(b) by 0 days.

(21) Appl. No.: 16/164,755

(22) Filed: Oct. 18, 2018

(51) Int. Cl.
*H02M 3/158* (2006.01)
*H02M 1/08* (2006.01)
*H02M 1/00* (2006.01)

(52) U.S. Cl.
CPC ............ *H02M 3/158* (2013.01); *H02M 1/08* (2013.01); *H02M 2001/0009* (2013.01); *H02M 2001/0083* (2013.01)

(58) Field of Classification Search
CPC ........ H02M 1/08; H02M 1/088; H02M 3/156; H02M 3/158; H02M 2001/0009; H02M 2001/0083; H02M 2001/009
See application file for complete search history.

(56) References Cited

U.S. PATENT DOCUMENTS

| 7,948,221 B2 * | 5/2011 | Watanabe | H02M 3/158 307/110 |
| 10,014,778 B1 * | 7/2018 | Wei | H02M 3/155 |
| 10,103,620 B1 * | 10/2018 | Wei | H02M 3/07 |
| 2014/0354251 A1 * | 12/2014 | Williams | H02M 3/158 323/271 |

* cited by examiner

*Primary Examiner* — Matthew V Nguyen
(74) *Attorney, Agent, or Firm* — Chih Feng Yeh; Huntington IP Consulting Co., Ltd.

(57) ABSTRACT

A single inductor multiple-output DC-DC converter includes an inductor coupled to a first input switch and a second input switch to store energy from supply source, wherein the first input switch is coupled to an input supply node, and the second input switch is coupled to ground, the first and the second switches controlling current through the inductor; a plurality of output switches, each output switch coupled to a common inductor node and to a corresponding output supply node, each of the output supply node having a voltage converted from an input voltage received at an input supply node; a freewheel switch coupled between the common inductor node and ground; a control circuit receiving a sensed inductor current and a plurality of feedback signals indicating error signals between output voltages and their corresponding reference voltages, the control circuit being configured to control timing and charging current of the inductor.

13 Claims, 7 Drawing Sheets

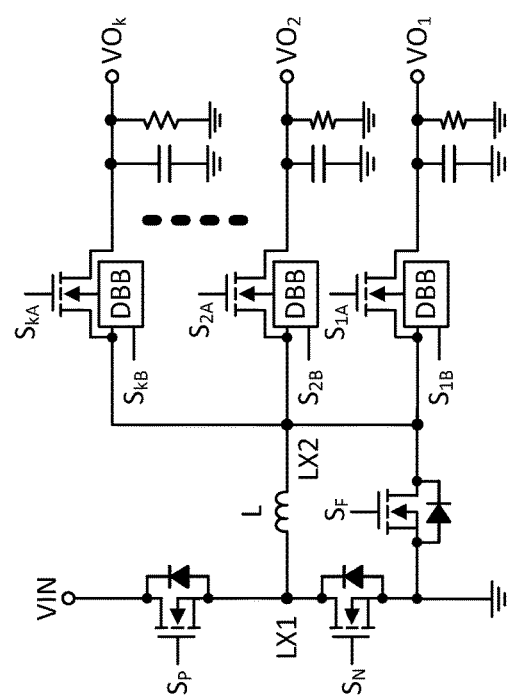
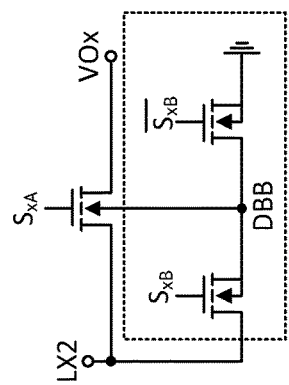
FIG. 5(a)
FIG. 5(b)

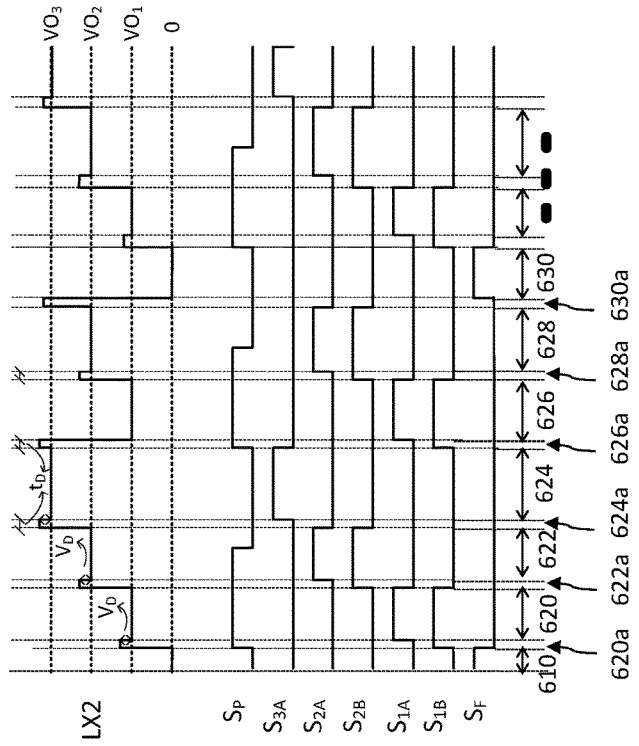
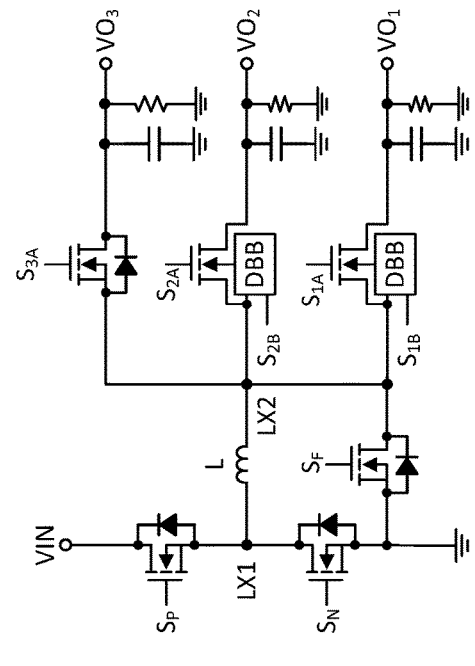
FIG. 6(a)
FIG. 6(b)

SINGLE-INDUCTOR MULTIPLE-OUTPUT DC/DC CONVERTERS WITH PULSE-SKIPPING MODE AND DEADTIME SWITCH CONTROL

TECHNICAL FIELD

The present invention generally relates to DC to DC converters, and more particularly to a single-inductor multiple-output DC/DC converter with pulse-skipping mode and deadtime switch control.

BACKGROUND

Many of today's electronic systems require power supplies that can operate from higher system voltages. Examples include systems designed for automotive, industrial, and communications equipment whose operating input voltages can be 12V, 24V, or 48V and can vary over a wide range with transit spikes that can easily cause damage to the equipment.

Automotive electronics operate from the car battery which experiences transient loads such as cold-cranks and load dumps which can range from 5V to over 40V. In addition, technologies such as start-stop increase the transient range dropping down to 3V in certain case. This requires off-battery power ICs to withstand the harsh conditions and reliably provide power to the whole vehicle.

Some electronic devices, for example automotive cameras, utilized in the advanced driver assistance systems are fast growing. To support the operation of the automotive cameras, a typical automotive camera power solution includes a power over coax filter network, mid-$V_{IN}$ step-down DC-DC converter, and a low-VN power management IC (PMIC) are usually applied to efficiently supply voltages used for imagers and their accompanying serializers. For meeting the requirement of small solution size for easy installation and low thermal fluctuation by image sensor, integration of a multiple-output buck DC-DC converter as a PMIC is suitable for this application.

Multiple parallel DC-DC buck converter are most commonly used to generate multiple output voltages or currents. A conventional multiple-output buck converter consisting of two-stage power conversion is utilized. The conventional two stage multiple output buck converter is illustrated in FIG. 1. It can achieve high power efficiency through distributive voltage/current levels because of the inherent characteristics of the DC-to-DC buck converter. However, this topology requires four inductors (L1, L21, L22, and L23) for three outputs (VOUT1, VOUT2 and VOUT3), therefore larger form factor is induced.

A single-inductor multiple-output (SIMO) architecture provides a better solution for tiny devices requiring good thermal performance, by integrating functionality in smaller devices that would otherwise require multiple discrete components. As depicted in FIG. 2, a SIMO buck converter can support multiple output stages (VOUT1, VOUT2 and VOUT3) while using only one inductor (L1), its conversion efficiency is one stage efficiency and larger output voltage ripple can be reduced by low dropout regulators (LDOs) if required. The SIMO buck converters has many advantages over the conventional two-stage multiple-output converter, such as they benefits from small size, light weight and significant overall cost saving. Moreover, the dropout voltages of the LDOs can be respectively set to low enough (e.g. 50 mV~100 mV) to optimize the power efficiency and finally the overall power efficiency can compete with the traditional two-stage configuration as FIG. 1 for many application conditions.

The concept of SIMO DC-DC converters arise in order to overcome the disadvantage of conventional converter such as complex and suffers from high cost, with multiple inductors and controllers required. The SIMO topology is capable of generating independently controlled buck, boost, and buck-boost outputs simultaneously. A control scheme is developed for reduced cross-regulation in SIMO DC-DC converters.

Since a SIMO converter can support multiple outputs while using only one inductor, it is an excellent candidate to minimize the component count and thus reduce the production cost. Apparently the area of print circuit board can be reduced greatly, thereby miniaturizing devices. However, the cross regulation of the SIMO converters suffer from instability in system dynamics due to coupled outputs. For a multiple-output converter with each output regulated independently, if one output is affected by the variation of other outputs, transient cross-regulation occurs. Therefore, minimizing the cross regulation is required in SIMO DC-DC converter design while improving the power delivery quality and the load driving capability are also important. For example, due to the demand increased power efficiency in PMICs, SIMO converter as the key device should be also operated under various load conditions, such as continuous current mode (CCM) in heavy load condition, discontinuous current mode (DCM) in light load condition, and pulse skipping mode in extreme light load or no load condition. To achieve these goals, a SIMO architecture with novel control scheme is still demanding.

SUMMARY OF THE INVENTION

In this invention, a single-inductor multiple-output DC/DC converter with pulse-skipping mode and deadtime switch control is proposed.

A single inductor multiple-output DC-DC converter includes an inductor coupled to a first input switch and a second input switch to store energy from supply source, wherein the first input switch is coupled to an input supply node, and the second input switch is coupled to ground, the first and the second switches controlling current through the inductor; a plurality of output switches, each output switch coupled to a common inductor node and to a corresponding output supply node, each of the output supply node having a voltage converted from an input voltage received at an input supply node; a freewheel switch coupled between the common inductor node and ground; a control circuit receiving a sensed inductor current and a plurality of feedback signals indicating error signals between output voltages on the corresponding plurality of output supply nodes and their corresponding reference voltages, the control circuit being configured to control timing and charging of the inductor through activating one of the input switches and discharging of the inductor through activating one of the output switches sequentially; wherein the first input switch and the first output switch are triggered by an oscillator in the control circuit for performing a constant frequency operation; wherein the control signal of the first input switch is response to the plurality of feedback signals and the sensed inductor current, and the second input switch having control signal is a non-overlap signal with the control of the first input switch; wherein the plurality of output switches, each of the output switch is response to their corresponding output voltage, reference voltage and sensed inductor current; wherein the plurality of output switches are turned on sequentially, the last output switch to be turned on having the remained time period after all the other output switches turned on sequentially.

In accordance with one aspect of the disclosure, if one of the output supply node enters pulse skipping mode at light load, control signal of the corresponding output switch is skipped and the freewheel switch is turned on for the remained time period.

In accordance with one aspect of the disclosure, the inductor current can be discharged to a zero current at phase where the corresponding output switch of the supply node entering pulse skipping mode is skipped before a new clock cycle.

In accordance with one aspect of the disclosure, the plurality of output switches are turned on sequentially according to their corresponding output supply nodes with an order from the smallest voltage to the highest voltage.

BRIEF DESCRIPTION OF THE DRAWINGS

The components, characteristics and advantages of the present invention may be understood by the detailed descriptions of the preferred embodiments outlined in the specification and the drawings attached:

FIG. 5a illustrates back-to-back switch configuration of the single-inductor multiple-output (SIMO) DC-DC converter according an embodiment of the present invention.

FIG. 5b illustrate dynamic body bias (DBB) circuitry according to the present invention.

FIG. 6a depicts a timing diagram for deadtime control of a SIMO DC-DC converter according to the present invention.

FIG. 6b illustrates back-to-back switch configuration of the single-inductor multiple-output (SIMO) DC-DC converter according an embodiment of the present invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

As mentioned earlier, minimizing the cross regulation is required in SIMO DC-DC converter design while improving the power delivery quality and the load driving capability are also very demanding. For improving the performance of the SIMO DC-DC converter, a single-inductor multiple-output DC/DC converter with pulse-skipping mode and deadtime switch control is proposed in this invention.

Figure 1:
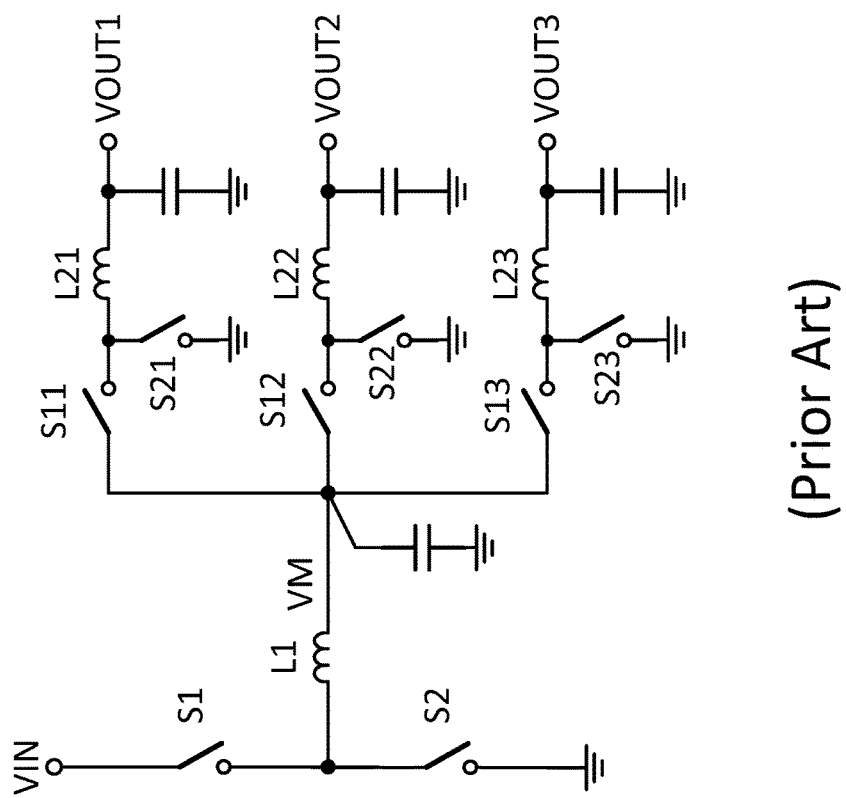
FIG. 1 illustrates a conventional two stage multiple output buck converter according to the prior art.
Figure 2:
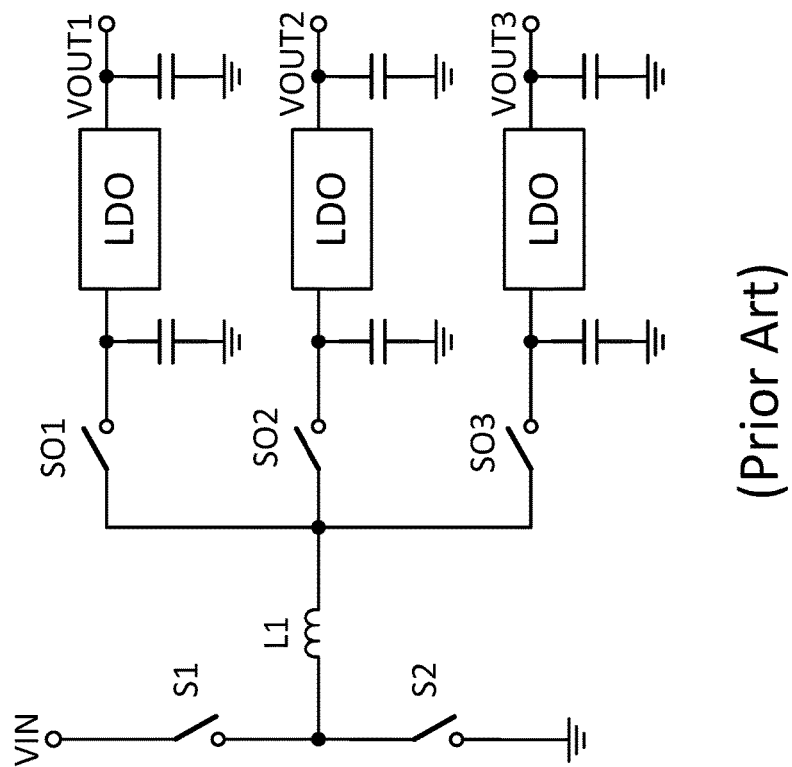
FIG. 2 illustrates a SIMO buck converter with low dropouts (LDOs) according to the prior art.
Figures 3A, 3B:
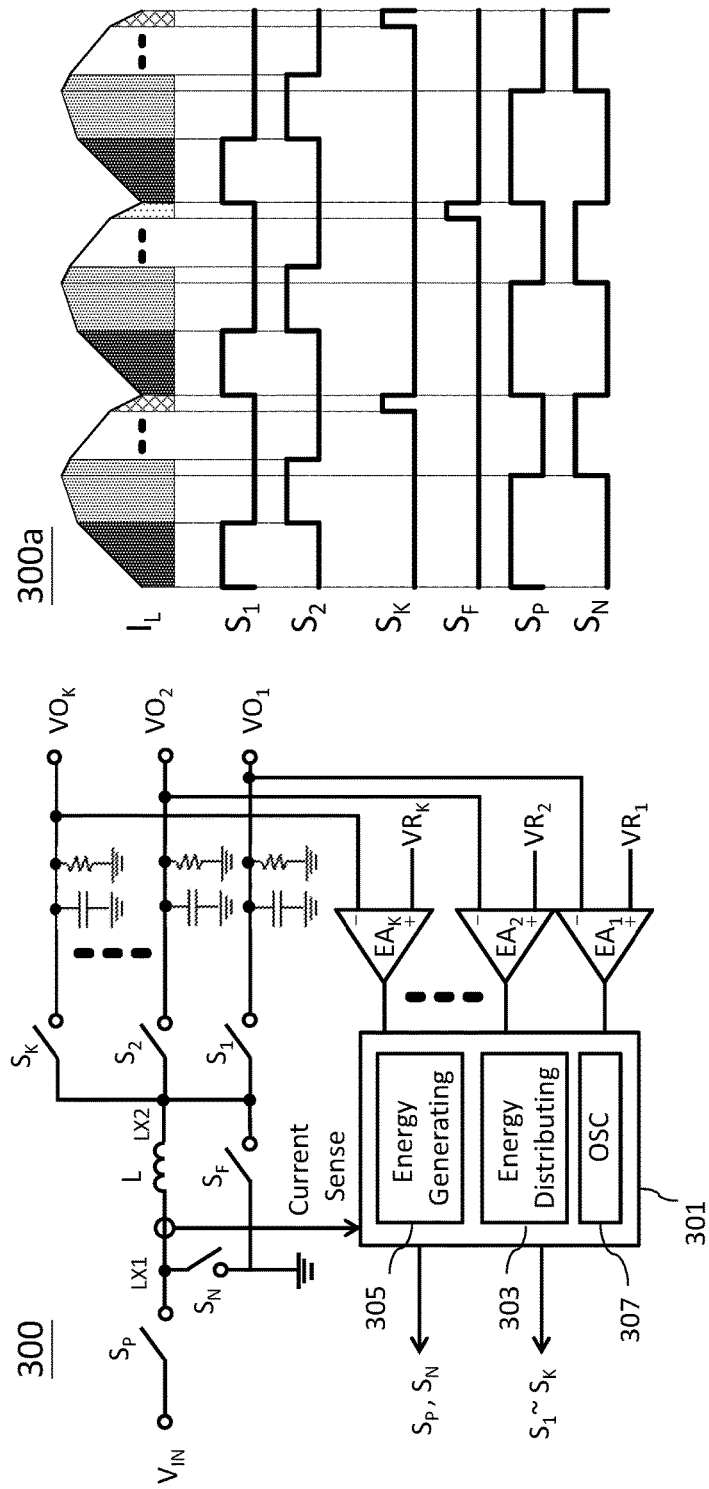
FIG. 3a illustrates the circuit of the single-inductor multiple-output (SIMO) DC-DC converter according to the present invention.
FIG. 3b illustrates the timing diagram of charge control single of the SIMO DC/DC converter according to the present invention.

FIG. 3a illustrates the circuit of the single-inductor multiple-output (SIMO) DC-DC converter according to the present invention. The SIMO DC-DC converter 300, which can power multiple outputs $VO_1, VO_2, \ldots, VO_K$, includes an inductor L, a plurality of error amplifiers (EAs) $EA_1, EA_2, \ldots, EA_K$, in feedback loops, one control circuit 301 and a plurality of switches $S_P, S_N, S_F, S_1, S_2, \ldots, S_K$. The plurality of EAs are respectively put in the feedback loops of the multiple outputs ($VO_1, VO_2, \ldots, VO_K$) to sense their voltage level and each of them having an input reference voltage level ($VR_1, VR_2, \ldots,$ or $VR_K$) to individually control their error accordingly. The EA is, usually but not limited to one operational transconductance amplifier (OTA). Similar to DC-DC buck converters, a high side (first) input switch $S_P$, low side (second) input switch $S_N$, and the inductor L control energy acquired from the input source $V_{IN}$ and store the energy in the inductor. In SIMO converters, K additional output switches $S_1, S_2, \ldots, S_K$ are configured to appropriately allocate energy to K outputs $VO_1, VO_2, \ldots, VO_K$. Except for input switches $S_P, S_N$, and output switches $S_1, S_2, \ldots, S_K$, which are required in the basic topologies of SIMO converters, an auxiliary freewheel switch $S_F$ in FIG. 3A is additionally adopted for pulse skip mode operation by introducing extra energy recovery duration.

In one embodiment of the present invention, one terminal LX1 of the inductor L coupled to input voltage $V_{IN}$ through the first input switch $S_P$ and coupled to ground through the second input switch $S_N$, output switches $S_1, S_2, \ldots, S_K$ coupled to a common inductor node LX2 and to a corresponding output supply node for allocating energy to outputs $VO_1, VO_2, \ldots, VO_K$. The freewheel switch $S_F$ is coupled to the common inductor node LX2 and ground. The control circuit 301, which contains an energy distributing unit 303 to measure the energy required by all the outputs for ensuring no voltage error compared to the reference at each output, an energy generating unit 305 extracting energy from the input to ensure no total voltage error at all outputs, and an oscillator 307 to generate constant frequency PWM gate control signals, is used to control the turning on/off periods of all switches. The duty cycle signals must be generated to control the input switches $S_P, S_N$, the freewheel switch $S_F$ and output switches $S_1, S_2, \ldots, S_K$, respectively, for the voltage regulation of each output.

FIG. 3b shows the timing diagram 300a of charge control single of the SIMO DC/DC converter according to the present invention. In the beginning of the cycle, switch $S_P$ turns on to charge each output by turning on $S_1$ through $S_K$ one by one, i.e. all the outputs sequentially share the magnetic energy of the inductor. In one period, a charging procedure includes both charging and discharging the inductor current, the switches $S_1$ to $S_K$ are turned on one at a time in an increasing order to charge the corresponding outputs, where the output voltages have the order of $VO_K \geq VO_{K-1} \geq \ldots \geq VO_2 \geq VO_1$. A full range current sensing circuit (not shown) is used to provide sensing current for the energy distributing unit 303 in the control circuit 301. At the same time, a generated current by the current sensor input into the energy generating unit 305. The energy generating unit 305 measures the total voltage error at all the outputs through a feedback loop to provide an adequate amount of energy for the inductor L. The energy distributing unit 303 produces the control signals for the switches $S_1, S_2$ to $S_K$, and signals $VO_1$, $VO_2$ to $VO_K$ which contain the information of energy required by the output channels. The control circuit 301 receives feedback signals indicating output voltages on the output supply nodes, the control circuit controlling the output switches for regulation of the output voltages in response to the feedback signals.

In operation, switches $S_P$ and $S_1$ are triggered by the oscillator 307 for a constant frequency operation. Voltage signals $S_P$, $S_N$, $S_F$, and $S_1$, $S_2$, ..., $S_K$ represent control signals (duty cycle signals) for switches $S_P$, $S_N$, $S_F$, $S_1$, $S_2$, ..., $S_K$, respectively. Switch control signal $S_P$ is response to error amplifiers $EA_1$-$EA_K$ and inductor current $I_L$, switch control signal $S_N$ is a non-overlap signal with $S_P$. Switch control signal $S_1$ is response to output voltage $VO_1$, reference voltage $VR_1$ and inductor current $I_L$, Switch control signal $S_2$ is response to output signal $VO_2$, reference voltage $VR_2$ and inductor current $I_L$, ..., switch control signal $S_{K-1}$ is response to output voltage $VO_{K-1}$, reference voltage $VR_{K-1}$ and inductor current $I_L$. Signal $V_K$ is the remained time period after switches $S_1$ to $S_{K-1}$ turned on sequentially.

Figure 3C:
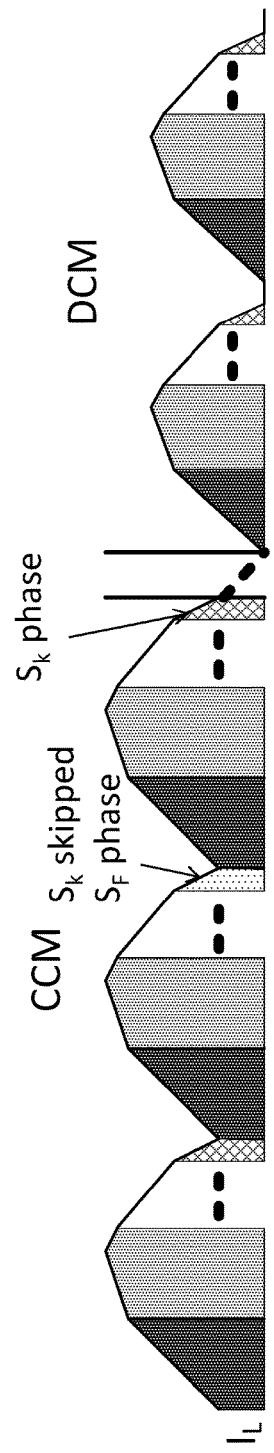
FIG. 3c illustrates the timing diagram of charge control single of the SIMO DC/DC converter in load transient situation with pulse skipping operation at last switching phase according to the present invention.

If output signal $VO_K$ entering pulse skip mode (PSM) at light load, control signal $V_K$ of the switch $S_K$ is skipped and switch $S_F$ turn on for the remaining period. In addition, in load transient situation, as illustrated in FIG. 3c, the inductor current $I_L$ could be discharged to zero current at $S_K$ phase before the new clock cycle, i.e. entering into a discontinuous current mode (DCM).

In the absence of deadtime, simultaneously turning on any two output switches in $S_1$ to $S_K$ results in the leakage of energy from one output to the other. This deteriorates the regulation performance and efficiency. Thus, the deadtime between any two switches is necessary to avoid redundant energy transfer.

Referring to the circuit shown in FIG. 3a, only concentrated on the switch configuration part. Input switching device $S_N$, which may be a synchronous rectifier, can connect between node LX1 and ground to conduct inductor L current when switch $S_P$ is off. In this manner, the switching actions of $S_P$ and $S_N$ are substantially complementary. To prevent cross-conduction between $S_P$ and $S_N$, a relatively short deadtime interval can occur when both $S_P$ and $S_N$ are off. Switches $S_P$ and $S_N$ can be implemented in any suitable way, such as MOS transistors, as compared to diodes. If $S_P$ and $S_N$ are implemented using MOS transistors, internal anti-parallel body diodes can provide conduction for inductor L current during this deadtime interval. If switching devices $S_P$ and $S_N$ do not have internal anti-parallel body diodes, an external diode may be added in parallel with each switching device, where the diode anode can each connect to lower voltage node.

The switching action of $S_1$, $S_2$, ..., $S_K$ can also be substantially complementary. In some applications, if an output voltage $VO_K$ is greater than an output voltage on $VO_{K-1}$, switching device $S_K$ can be replaced by a traditional rectifier diode with an anode connecting node LX2 and a cathode connecting to output $VO_K$. If switches $S_K$ and $S_{K-1}$ are implemented using MOS transistors, the anode of an internal body diode of $S_K$ can connect to node LX2, and the cathode of the internal body diode of $S_{K-1}$ ($S_K$) can connect to node LX2 ($VO_K$).

Figure 4B:
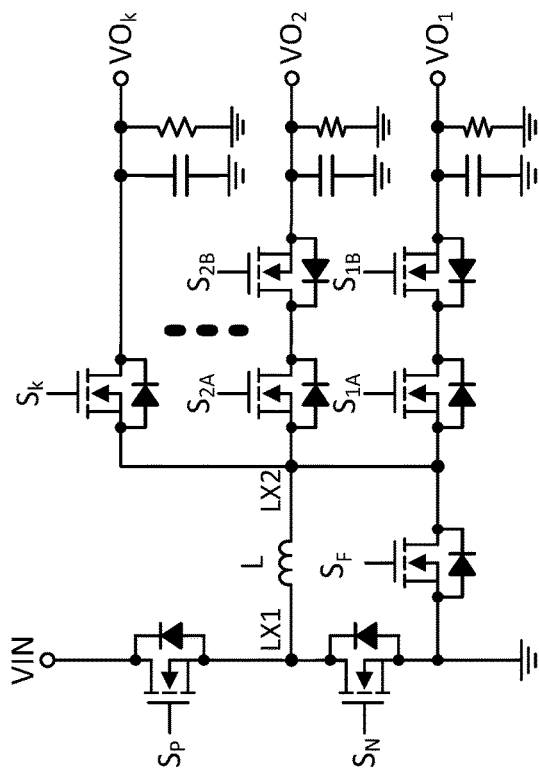
FIG. 4a-b illustrate back-to-back switch configuration of the single-inductor multiple-output (SIMO) DC-DC converter according an embodiment of the present invention.
Figure 4A:
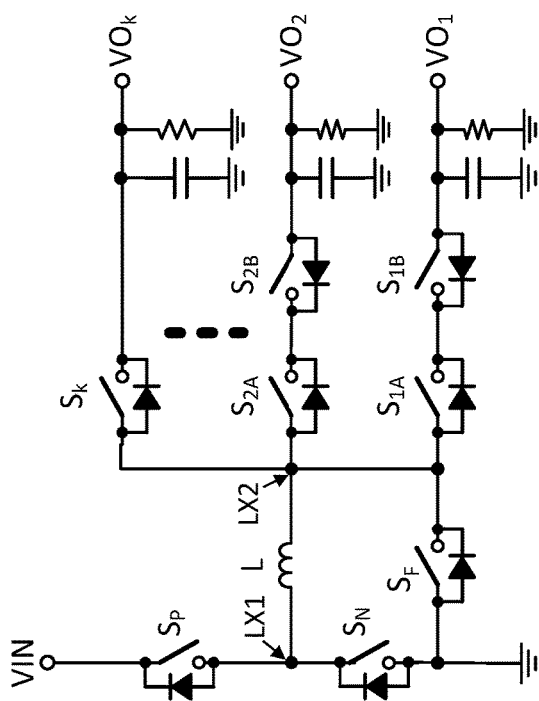

Referring to FIG. 4a, it shows a back-to-back switch configuration ($S_{K-1A}$, $S_{K-1B}$, ..., $S_{2A}$, $S_{2B}$, $S_{1A}$, $S_{1B}$) for all output switches except for the switch connecting to the highest output voltage rails. FIG. 4b shows an example that back-to-back switches are realized by NMOSFETs. Apparently, these switches can be also realized by PMOSFETs. Thus, the switch $S_K$ that connects to the highest output voltage $VO_K$ is configured to have a body diode having its anode connecting to node LX2 and cathode connecting to the output node $VO_K$; switches $S_1$, $S_2$, ..., $S_{K-1}$ are configured to in a way such that no any body diode of the output switch can be turned on for voltage at node LX2 being higher or lower than $VO_1$, $VO_2$, ..., $VO_{K-1}$.

In other embodiment, as depicted in FIG. 5, the back-to-back switch configurations ($S_K$, $S_{K-1A}$, $S_{K-1B}$, ..., $S_{2A}$, $S_{2B}$, $S_{1A}$, $S_{1B}$) illustrated in FIG. 4a and FIG. 4b can be replaced by a dynamic body switch between LX2 and $VO_x$, where $VO_x$ can be $VO_1$, $VO_2$, ..., $VO_K$. FIG. 5a illustrates a switch configuration with the dynamic body bias (DBB) circuitry according to one embodiment of the present invention, in each output switch, $S_1$, $S_2$, ..., or $S_K$, its body is added a dynamic body bias (DBB) circuitry. This DBB circuitry is reported in FIG. 5b, where the body of the transistor is connected to ground when the transistor is off. This allows the transistor to block forward and reverse voltages. When the transistor turns on, the body is connected to the source, here is LX2, to ensure low threshold voltage, ensuring low on-resistance. The switch control between the body diode connecting to ground or LX2, e.g, $S_{xB}$ or $\overline{S_{xB}}$, respectively, should be non-overlap to prevent shoot-through current from LX2 to ground.

The previous mentioned SIMO DC-DC converter with back-to-back switch or DBB configuration can also operate in the following situations:

(a) If output voltage $VO_k$ is entering in pulse skipping mode (PSM) at light load, output switch $S_{k-1}$ is configured to having a body diode, its anode connects to node LX2 and its cathode connects to $VO_{k-1}$. Output switches $S_1$, $S_2$, ..., $S_{k-2}$ are configured in a way such that no any body diode of the output switch can be turned on for both voltage at node LX2 is higher or lower than output voltages $VO_1$, $VO_2$, ..., $VO_{k-2}$.

(b) If $VO_k$, $VO_{k-1}$, ..., and $VO_{k-m}$ are all entering in pulse skipping mode (PSM) at light load, output switch $S_{k-m-1}$ is configured to having a body diode, its anode connects to node LX2 and its cathode connects to $VO_{k-m-1}$. Output switches $S_1$, $S_2$, ..., $S_{k-m-2}$ are configured in a way such that no any body diode of the output switch can be turned on for both voltage at node LX2 is higher or lower than output voltages $VO_1$, $VO_2$, ..., $VO_{k-m-2}$.

As synchronous rectification is applied for high efficiency and proper output voltage control, deadtime should be managed to guarantee appropriate non-overlap between on-states of the power switches during switching transient. To perform a deadtime switch control, the back-to-back or dynamic body diode switch configurations illustrates in FIG. 6B is considered as an example. In time period 610 only freewheel switch $S_F$ is turned on, the inductor L is connected to ground, therefore the voltage at node LX2 (e.g., common inductor node) is zero. During time interval 620a input switch $S_p$ and output switch $S_{1B}$ are turned on, and freewheel switch $S_F$ is turned off, while all other switches remains off, because the body diode of output switch $S_{1A}$ is forward biased and the inductor current can charge output node $VO_1$, the voltage at node LX2 is $VO_1+V_D$, where $V_D$ is the body diode voltage of output switch $S_{1A}$. After passing time interval 620a, in the next time interval 620 output switches $S_{1B}$ and $S_{1A}$ are both on, the voltage at node LX2 is $VO_1$. Similarly, in time period 622a output switch $S_{2B}$ is turned on, switch $S_{2A}$ remained off in this short period of time and all other output switches are off, voltage at node LX2 is $VO_2+V_D$, where $V_D$ is the body diode voltage of switch $S_{2A}$. In following time period 622 output switches $S_{2B}$ and $S_{2A}$ are both on, input switch $S_p$ remained on for a period of time shorter than time period 622 then turned off, the voltage at node LX2 is VO$_2$. In time period 624a, output switches S$_{2B}$ and S$_{2A}$ are turned off, and all other output switches are off, the voltage at node LX2 is VO$_3$+V$_D$, where V$_D$ is the body diode voltage switch S$_{3A}$. In time period 624, output switch S$_{3A}$ is turned on the voltage at node LX2 is VO$_3$. During time period 626a, output switch S$_{3A}$ is off, input switch S$_P$ is turned on again, and output switch S$_{1B}$ is turned back on, the voltage at node LX2 is VO$_3$+V$_D$. In next time period 626, the operation of SIMO with the DBB switch configuration is the same as that described in time period 620, the voltage at node LX2 is VO$_1$. In the time period 628a, the operation of SIMO is the same as that described in time period 622a, the voltage at node LX2 is VO$_2$+V$_D$. In time period 628, the operation of SIMO is the same as that described in time period 622, the voltage at node LX2 is VO$_2$. During time period 630a, the operation of SIMO is the same as that described in time period 624a, the voltage at node LX2 is VO$_3$+V$_D$. In time period 630, the freewheel switch S$_F$ is turned on and all the remaining switches are off, node LX2 is connected to ground, therefore the voltage at node LX2 is zero. After this time period, the operation of SIMO repeats again as it's starting from the time period 620a.

An input switch and single inductor L can control current flowing from the input voltage VIN to the common inductor node LX2. From common inductor node LX2, any of output nodes (e.g., VO$_3$, VO$_2$, and VO$_1$) across corresponding capacitor can receive inductor current using output switches (e.g., S$_{3A}$, S$_{3B}$, S$_{2A}$, S$_{2B}$, S$_{1A}$ and S$_{1B}$). In this particular example, the output voltages are arranged as VO$_3 \geq$ VO$_2 \geq$ VO$_1$.

FIG. 6a depicts a timing diagram for deadtime control of a SIMO DC-DC converter according to the DBB switch configuration proposed in FIG. 6b.

The back-to-back or DBB switch configuration of the SIMO converter can reduce power loss by preventing output voltage shoot through between charging process for different outputs in deadtime control scheme.

In conclusion, the SIMO converter proposed in this invention having advantages of operating in large load range, minimizing deadtime loss, and reduce cross regulation.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A single inductor multiple-output DC-DC converter comprising:
    an inductor coupled to a first input switch and a second input switch to convert energy from supply source, wherein the first input switch is coupled to an input supply node, and the second input switch is coupled to ground, the first and the second switches controlling current through the inductor;
    a plurality of output switches, each output switch coupled to a common inductor node and to a corresponding output supply node, each of the output supply node having a voltage converted from an input voltage received at the input supply node;
    a freewheel switch coupled between the common inductor node and ground;
    a control circuit receiving a sensed inductor current and a plurality of feedback signals indicating error signals between output voltages on the corresponding plurality of output supply nodes and their corresponding reference voltages, the control circuit being configured to control timing and charging current of the inductor through activating one of the input switches and discharging of the inductor through activating one of the output switches sequentially;
    wherein the first input switch and the first output switch are triggered by an oscillator in the control circuit for performing a constant frequency operation;
    wherein a control signal of the first input switch is response to the plurality of feedback signals and the sensed inductor current, and the second input switch having a control signal is a non-overlap signal with the control signal of the first input switch;
    wherein the plurality of output switches, each of the output switch is response to their corresponding output voltage, reference voltage and sensed inductor current; and
    wherein the plurality of output switches are turned on sequentially, the last output switch to be turned on having the remained time period after all the other output switches turned on sequentially.

2. The single inductor multiple-output DC-DC converter of claim 1, wherein the last output supply node enters pulse skipping mode at light load, control signal of the corresponding output switch is skipped and the freewheel switch is turned on for the remained time period.

3. The single inductor multiple-output DC-DC converter of claim 2, wherein the inductor current can be discharged to a zero current at a phase where the corresponding output switch of the supply node entering pulse skipping mode is skipped before a new clock cycle.

4. The single inductor multiple-output DC-DC converter of claim 3, wherein one of the plurality the output switches corresponding to one of the plurality of output supply nodes having a highest voltage is configured to have a body diode, its anode is connected to the common inductor node and its cathode is connected to the corresponding output supply node, wherein the remaining output switches are configured to in a way such that no any body diode of the output switch can be turned on for both voltage at the common inductor node is higher or lower than the output voltages of the corresponding remaining output switches.

5. The single inductor multiple-output DC-DC converter of claim 4, wherein one of the output supply node having the highest voltage enters pulse skipping mode at light load, an output switch corresponding to one of the output supply node having the second highest voltage is configured to having a body diode, its anode connects to the common inductor node and its cathode connects to the output supply node having the second highest voltage, wherein the remaining output switches are configured in a way such that no any body diode of the output switch can be turned on for both voltage at the common inductor node is higher or lower than output voltages of the corresponding remaining output switches.

6. The single inductor multiple-output DC-DC converter of claim 5, wherein a portion of the plurality of output supply nodes having voltages from highest to lowest among them enter pulse skipping mode at light load, an output switch corresponding to one of the output supply node having the second highest voltage excluding the portion of the plurality of output supply nodes is configured to having a body diode, its anode connects to the common inductor node and its cathode connects to the output supply node having the second highest voltage excluding the portion of the plurality of output supply nodes, wherein the remaining output switches are configured in a way such that no any body diode of the output switch can be turned on for both voltage at the common inductor node is higher or lower than output voltages of the corresponding remaining output switches.

7. The single inductor multiple-output DC-DC converter of claim 1, wherein the control circuit further comprises:

an energy distributing unit configured to measuring the energy required by all the outputs by comparing the reference voltage at each output; and an energy generating unit configured to extracting energy from the input, to ensure no total voltage error through the feedback signals.

8. The single inductor multiple-output DC-DC converter of claim 1, wherein the highest voltage output switch comprises a diode.

9. The single inductor multiple-output DC-DC converter of claim 1, wherein the highest voltage output switch comprises a synchronous rectifier.

10. The single inductor multiple-output DC-DC converter of claim 1, wherein at least one of the plurality of output switches comprises two MOS transistor coupled in a back-to-back arrangement or a MOS transistor with a dynamic body bias circuit.

11. The single inductor multiple-output DC-DC converter of claim 1, further comprising a plurality of error amplifiers (EAs), each of the error amplifier being respectively placed in the feedback loops coupled to the corresponding output supply node to sense their voltage level and each of them having a reference voltage to individually control their error.

12. The single inductor multiple-output DC-DC converter of claim 11, wherein error amplifier is an operational transconductance amplifier (OTA).

13. The single inductor multiple-output DC-DC converter of claim 1, wherein the oscillator in the control circuit generates constant frequency PWM gate control signals for controlling the turning on/off periods of the input and output switches.

* * * * *